Aug. 30, 1932.  F. C. DALTON  1,874,247
ROTARY GAS ENGINE
Filed March 2, 1927  3 Sheets-Sheet 1
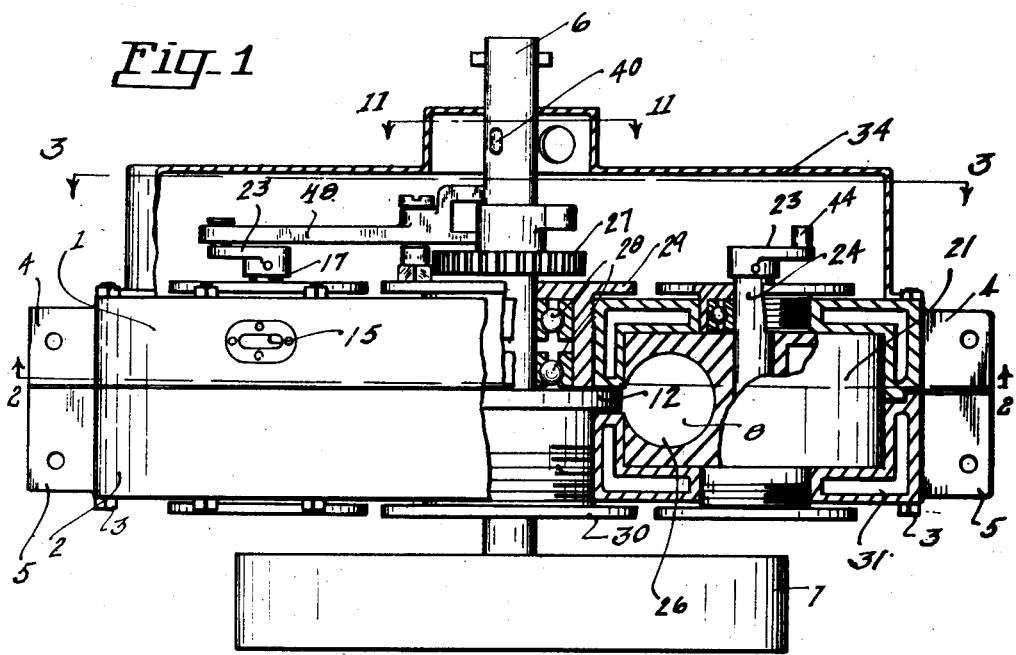
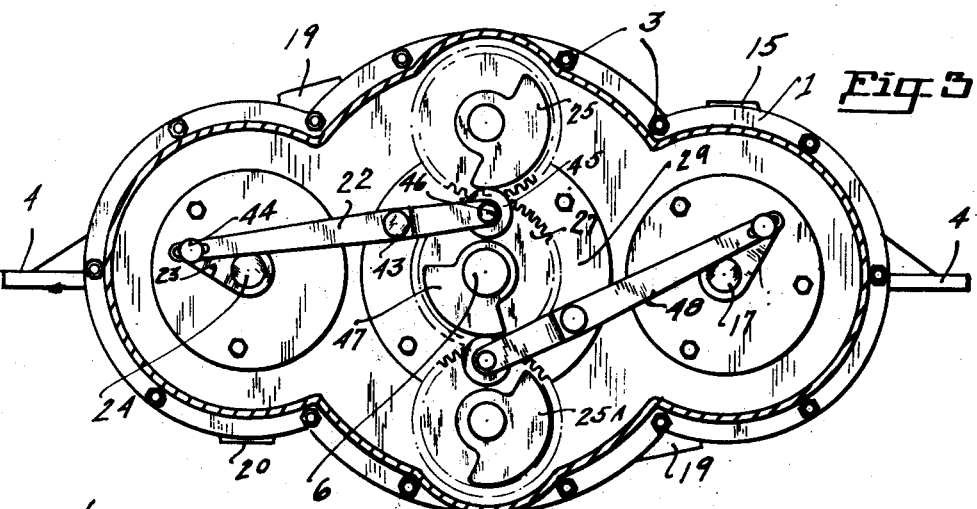
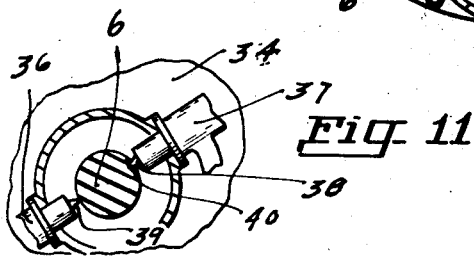
Inventor
Frederick C. Dalton
Attorney Aug. 30, 1932. F. C. DALTON 1,874,247

ROTARY GAS ENGINE

Filed March 2, 1927 3 Sheets-Sheet 2

Aug. 30, 1932.　　　F. C. DALTON　　　1,874,247
ROTARY GAS ENGINE
Filed March 2, 1927　　3 Sheets-Sheet 3

Inventor
Frederick C. Dalton
Attorney

Patented Aug. 30, 1932

1,874,247

UNITED STATES PATENT OFFICE

FREDERICK C. DALTON, OF PORTLAND, OREGON, ASSIGNOR OF TWO-THIRDS TO R. F. BICKNELL, OF BOISE, IDAHO

ROTARY GAS ENGINE

Application filed March 2, 1927. Serial No. 172,013.

The primary object of my invention consists in the construction of a rotary gas motor having but few parts, of minimum weight, and one that will be highly efficient in its operation and easy of control.

My invention consists primarily of a central shaft, a rotary element associated with the shaft, an annular cylindrical piston way, a piston associated with the annular cylindrical piston way, inlet and outlet ports associated with the piston way, a firing element consisting of a spark plug and means for controlling the admission of fuel to the inlet ports and outlet ports, and a wing connecting the piston element with the central shaft.

Still further objects of my invention consist in providing a multiple of valves associated with the piston way for aiding in the scavenging of the burned gases and at the same time to form a closure in the piston way after the passage of the piston there past to form a combustion chamber for the exploding of the new charge of fuel therein, and to thereby impart a new power impulse to the piston.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings herewith included I have shown a motor wherein two complete cycles of power impulses are imparted to the piston on each revolution of the same about the central axis, but I do not wish to be limited to this number as in larger motors it may be desirable to have a multiple of impulses imparted to the piston in each revolution of the same about the central axis, or a larger number than here shown.

In my new and improved rotary gas motor; for the purposes of description, I am describing the same for use on a hydro-carbon fuel but the same may be used efficiently in the uses of steam and I therefore do not wish to be limited to the application of the same on hydro-carbon fuels.

In my motor I use an annular cylindrical raceway for the piston travel, having inlet and exhaust ports associated with said annular race way and have oppositely disposed rotary valves associated therewith, the object of which is to form the wall of compression within the annular cylindrical raceway after the passage of the piston therepast.

In the drawings:—

Fig. 1 is a top plan view, partially in section, of my assembled device.

Fig. 3 is a cross section view, taken on line 3—3 of Fig. 1, looking in the direction indicated.

Fig. 4 is a fragmentary cross section view, of the annular cylindrical raceway, taken on line 4—4 of Fig. 2, looking in the direction indicated, the same being taken through the inlet port.

Fig. 5 is a fragmentary cross section view, of the annular cylindrical raceway, taken on line 5—5 of Fig. 2, looking in the direction indicated, the same being a cross section view through the exhaust port.

Fig. 6 is a fragmentary cross section view, taken on line 6—6 of Fig. 2, looking in the direction indicated, the same being and illustrating a preferred form of construction of fastening the piston to a wing of the rotor secured to the central shaft and illustrating a preferred embodiment of locking pins for maintaining the same in position.

Fig. 7 is a cross section view, taken on line 7—7 of Fig. 6, looking in the direction indicated.

Fig. 11 is a fragmentary cross section view, taken on line 11—11 of Fig. 1, looking in the direction indicated, this shows the operating mechanism for operating the valves for the inlet of the fuel charge.

Like reference characters refer to like parts throughout the several views.

Figure 2:
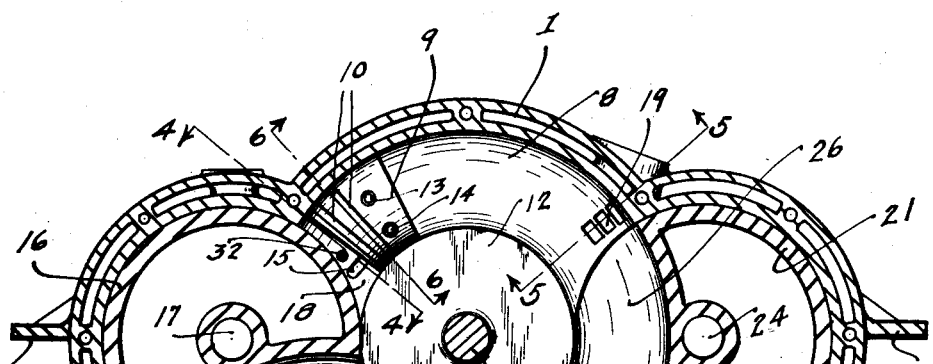
Fig. 2 is a cross section view, taken on line 2—2 of Fig. 1, looking in the direction indicated; in this position the piston is shown in position for firing the fuel charge.
Figure 8:
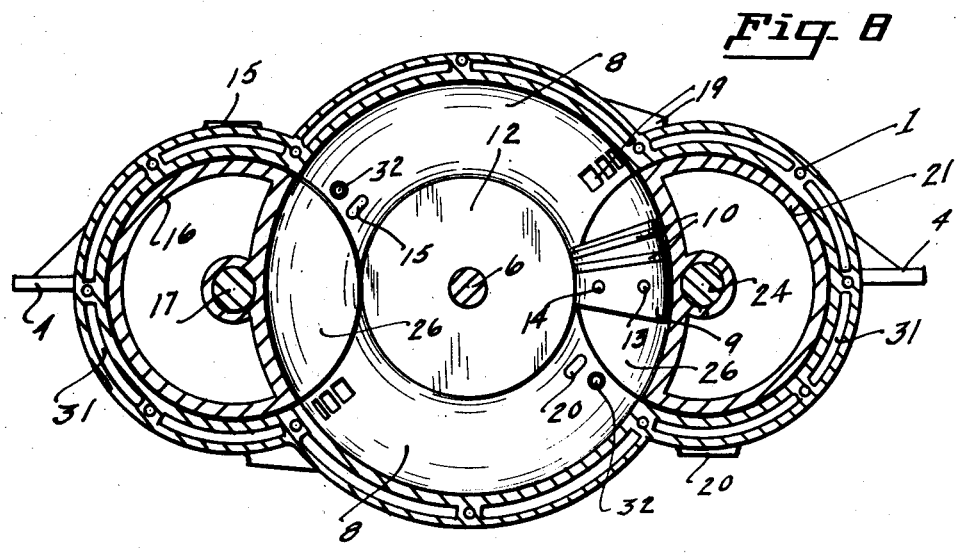
Fig. 8 is a cross section view, illustrating the piston in position after the same has passed the exhaust ports and the same being exposed between the exhaust and inlet ports.
Figure 9:
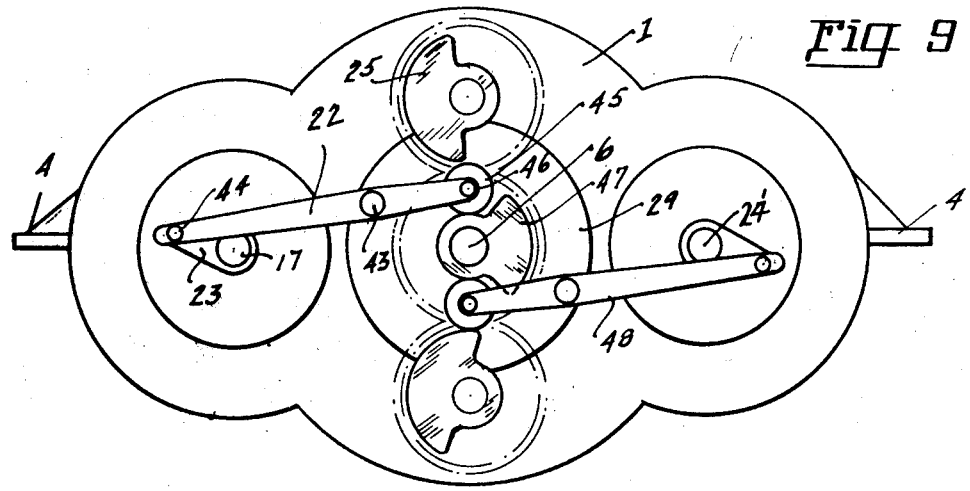
Fig. 9 is a side elevation of the assembled motor illustrating the cams and actuating levers associated therewith for controlling the alternate partial rotation relative to the piston travel and to form a compression wall chamber for the firing of the fuel charge therein.

I have observed in my experimenting with the motor as herein described, that best results are obtained wherein the fuel charge is supplied under relatively high initial pressures.

I form my motor frame element preferably of two side members 1 and 2, and secure the same together by any suitable fastening means, as by threaded elements 3. Flange projections 4 and 5 being disposed on either end of the frame members to form a supporting base for the unit. A centrally disposed shaft 6 passes through the center of the same to which a suitable fly wheel 7 is secured. I form central of the framed elements an annular cylindrical raceway 8, through which the piston 9 passes. The piston 9 has suitable piston rings 10 secured thereto for forming contact with the walls of the annular cylindrical raceway 8. In my new and improved motor the piston 9 is in fixed relationship with the center of rotation because of the same being secured to the wing 11A of the rotor 12. The piston is secured to the wing 11A by locking pins 13 and 14 which are in threaded relationship to maintain the piston relatively fixed in relation to the wing 11A. When thus constructed within fine working limits, the piston itself does not engage the walls 8 of the annular cylindrical raceway and a contact only is made through an oil film and the piston rings associated therewith. The rotor 12 is in fixed relation with the central shaft 6.

In Fig. 2 I have shown the piston 9 as having passed the inlet port 15 and the abutment 16 having been partially rotated about its center of rotation 17 to form a compression wall within the annular cylindrical raceway 8, thus forming a compression chamber 18 of minimum capacity.

I have found in the operation of my new and improved motor that best results are obtained when the fuel charge is admitted into the explosion chamber under fairly high pressures. In the motor herein illustrated this is found advantageous because of the quick acting valve that actuates the inlet of the fuel through the inlet port 15. Any suitable valve mechanism being provided for closing the inlet port after the fuel charge has been admitted into the explosion chamber 18. The exploding of the fuel charge carries the piston 9 and the rotor 12, past the exhaust ports 19, as illustrated in Fig. 2, at which time the exploded charge is exhausted through the exhaust ports 19. The momentum of the fly wheel then carries the piston and the rotor 12 past the inlet port 20. The abutment 21 is then actuated through the actuating lever 22 connecting the arm 23 disposed about the abutment shaft 24 and is actuated through the actuating cam 25. To permit of the passage of the piston 9, the abutment 21 is maintained in position, as illustrated in Fig. 2, until the piston 9 has passed the line of travel of the abutment 21 at which time the same is actuated by the train of mechanism associated therewith and the cycle of operation is completed. The lever 22 oscillates about the pin 43 and one end of the same is in contact with the crank pin 44 and the opposite end of the same carries a cam roller 45 journaled about pin 46. The cam 47 mounted upon the central shaft 6 oscillates the lever 22 in one direction through the cam 47 actuating upon the roller 45 and the abutment 21 is actuated in one direction. The cam 25 contacting with the roller 45 actuates the lever 22 in the opposite direction and therefore rotates the abutment 21 in the opposite direction. The abutment 16 is actuated in a like manner through the action of the lever 48 and the related and like elements. The partial rotation of the abutment 21 about its center of rotation scavenges the explosion charge by removing any spent gases that may have been accumulated within the arc of rotation of the abutment 21, when the valve is partially disposed, within the chamber 26. A gear 27 disposed about the central shaft 6 for actuating the train of gears associated therewith. The rotor 12 is mounted upon any form of frictionless bearings as herein illustrated, as ball bearings 28, and adjustment and packing glands 29 and 30 are disposed upon either side which are in associated relationship with the frame elements. A suitable water jacket is formed about the frame, as illustrated at 31, for maintaining suitable operating temperatures within the motor. If the motor is to be operated as a hydro-carbon motor, a firing element, as a spark plug 32, is disposed within each explosion chamber for the charge.

Figure 10:
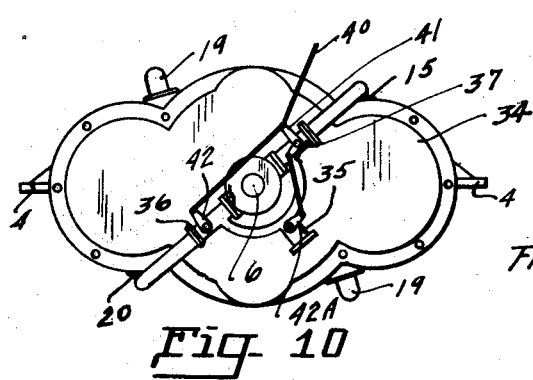
Fig. 10 is a side elevation of the same mechanism illustrated in Fig. 9, except on the oppositely disposed side and is made to illustrate the elements for supplying fuel to the motor.

In Fig. 10 is shown the levers for operating the inlet valves, the rod 33 being operated from a source not here shown, but the same being actuated in timed relationship with the rotation of the central shaft 6 and also in timed relation with the operation of the abutments 16 and 21. A closure 34 is placed about the central shaft and the actuating cams for operating the valves to prevent foreign matter from coming in contact with the camming surfaces. The same is secured in place by any suitable fastening means. The abutments 16 and 21 are mounted upon stub shafts 17 and 24 respectively to which operating cranks 22 and 48 respectively are attached. The bearings are journaled within the closure 34. Glands are in threaded engagement with the main frame for mounting the bearings and for maintaining the shafts in relative position therewith. The fuel is admitted through the manifold 35 and thence passes through a bifurcated end in which the inlet valves 41 and 42 are placed, to carry the fuel charge to the explosion chamber.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:—

1. An abutment actuating apparatus to be used with a rotary engine of the class described, comprising a main shaft centrally disposed within the engine casing, a primary gear secured to the main shaft, a primary cam secured to the main shaft and disposed next to the primary gear, a pair of secondary gears rotatably disposed within the engine casing immediately above and below the primary gear and in working relationship therewith, a pair of secondary cams disposed within the engine next to the secondary gears and in direct alignment with the primary cam, an abutment arm secured to each of the rotors of the engine, a pair of levers rockably journaled within the engine casing, and in direct alignment with all of the cams, said levers being secured to the abutment arms on their one end, and a cam roller disposed upon the free end of the levers, said rollers being in registerable alignment with all of the cams.

2. In a rotary engine of the character described, an abutment actuating mechanism disposed within the engine casing comprising a main shaft rotatably disposed centrally within the casing, a central gear wheel fixedly disposed about the main shaft, secondary gear wheels rotatably disposed within the engine and in working relationship with the central gear wheel, a primary cam disposed about the main shaft in intimate contact with the main gear wheel, secondary cams associated with the secondary gear wheels and in direct alignment with each other and with the primary cam, levers movably journaled near the outer periphery of the rotor, a cam roller disposed on the free end of each of the levers, abutment shafts disposed at each side of the main shaft, an abutment fixedly disposed about each abutment shaft, arms disposed about one end of the abutment shafts to which the oppositely disposed ends of the levers are attached, said arms adapted to oscillate the levers in opposite directions in timed relationship with the rotation of the rotor.

FREDERICK C. DALTON.